United States Patent Office 2,935,762
Patented May 10, 1960

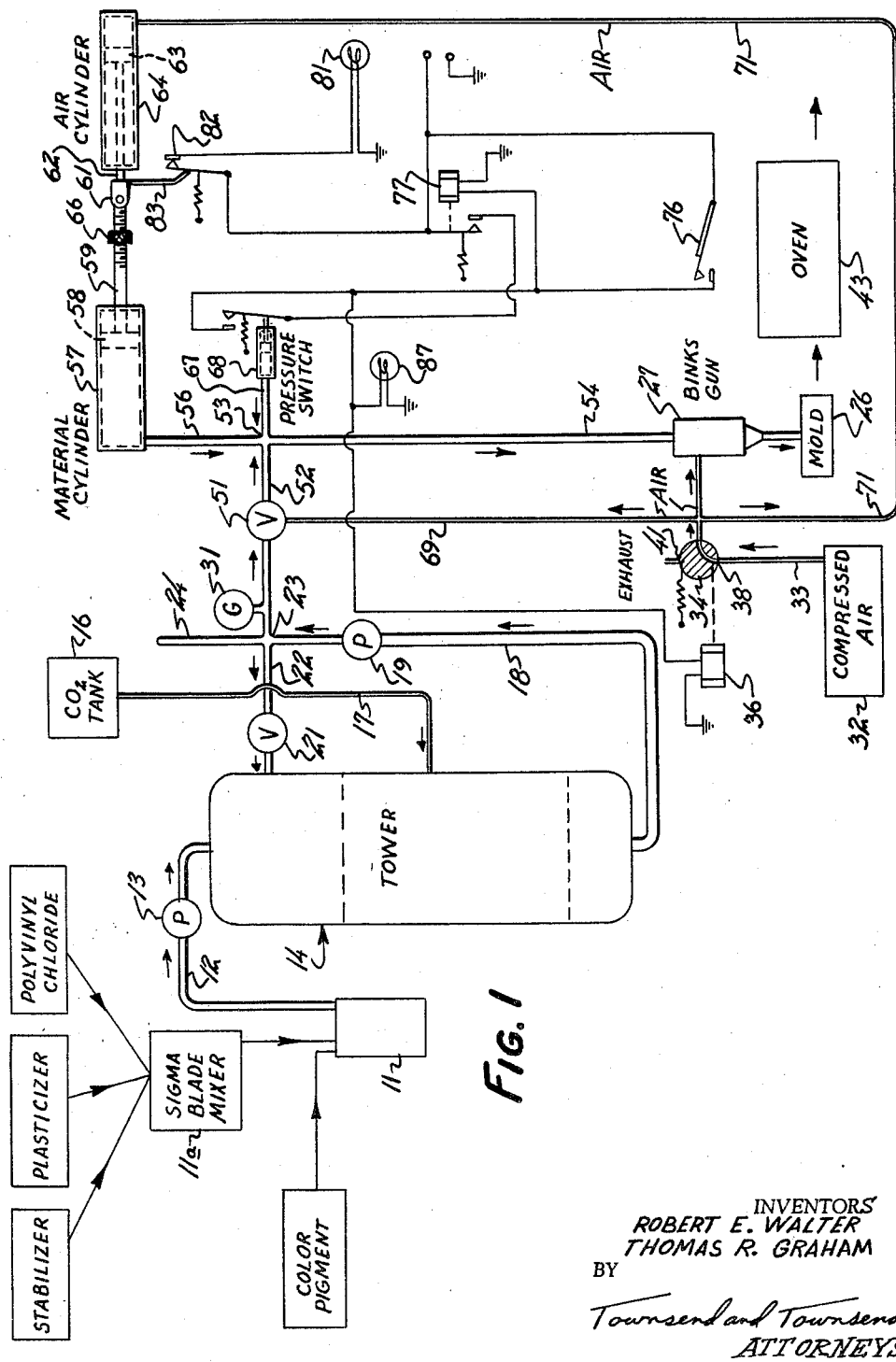

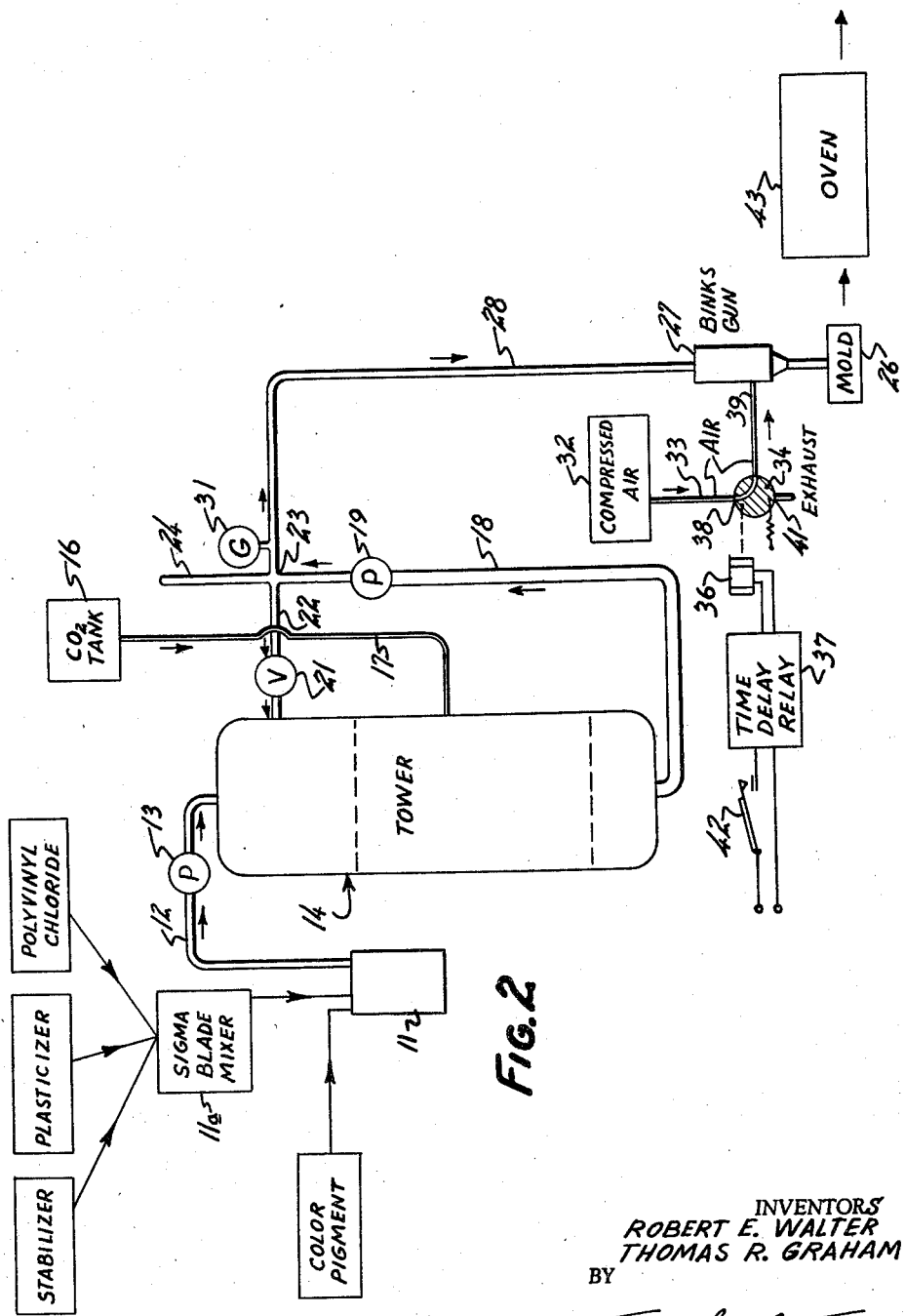

2,935,762

PRODUCTION OF MOLDED SPONGE PLASTIC

Robert E. Walter, St. Louis, and Thomas R. Graham, Glendale, Mo., assignors to Gerber Products Company, Fremont, Mich., a corporation of Michigan Application March 4, 1957, Serial No. 643,677

5 Claims. (Cl. 18—48)

This invention relates to a method of forming molded sponge plastic articles. More particularly the invention relates to the absorption of inert gas in a plastisol at relatively low pressure and subsequent raising of the pressure of the gassed plastisol prior to injection into the mold.

A principal object of the present invention is to improve the characteristics of the gassed plastisol by reducing the cell size of the gas pockets. This is accomplished by employing a pressure in the absorption tower which is considerably below the pressures previously employed, with the result that the gas is absorbed more slowly than when high pressures are employed.

In order properly to fill the mold, a relatively high pressure at the mold is required, and heretofore the pressure in the tower in which the gas is absorbed has been substantially the same as the pressure at the injection gun. In the present invention the pressure of the gassed plastisol is raised from a relatively low tower pressure to a relatively high gun pressure. The result is the formation of a cell structure of reduced size and yet a complete filling of the mold. In order to accomplish the pressure differential, a pump is installed between tower and gun and the conduit between pump and gun is of restricted diameter.

Another feature of the invention is the provision of means for automatically metering the amount of gassed plastisol injected into each mold by use of a solenoid-controlled valve wherein the volume injected into each mold is correlated to the volume of the mold less the amount of expansion of the foam.

Accordingly the present invention results in the delivery to the mold of an unexpanded, more controllable fluid rather than a partially expanded, less manageable froth, as accomplished in the prior art, which prior art practice resulted in a high percentage of rejects, due to unsatisfactory filling of the mold. The present invention provides a more fluid foam as distinguished from the relatively dry foam heretofore produced. By employing a filling pressure which is considerably higher than the tower pressure, the more fluid foam is produced, and in addition, more uniform metering of the quantity of plastisol injected into the mold is accomplished.

The term "plastisol" as used herein means and is intended to mean the mixture of materials employed to produce foam plastic in accordance with this invention and specifically to include mixtures of the essential ingredients, including polyvinyl chloride, a plasticizer, a stabilizer, as well as additive ingredients, which may or may not be desired according to the use to which the product is to be put. Included in such additive ingredients may be pigments, perfumed wax, deodorants and other materials for different and sundry purposes.

Other objects of the present invention will become apparent upon reading the following specification and referring to the accompanying drawings in which similar characters of reference represent corresponding parts in each of the several views.

In the drawings:

Fig. 1 is a schematic view of a mechanical and electrical system employed in the invention; and Fig. 2 is a modification of the system of Fig. 1.

The present invention relates to the production of a molded sponge plastic material. The ingredients of such plastic materials may be classified generally as follows:

(1) A polyvinyl chloride finely ground to particle size of 1 to 2 microns, as commercially available.

(2) A plasticizer in which the polyvinyl chloride is dispersed and which is liquid at room temperature and upon application of heat swells the polyvinyl chloride particles and fuses them into one mass. Among the suitable plasticizers, of which there are many, are the following:

| Chemical Names | Trade Names of Plasticizers which cannot be expressed by chemical names |
|---|---|
| Dibutyl Phthalate. Dimethyl Phthalate. Dioctyl Adipate. Tricresyl Phosphate. Dioctyl Phthalate. | Paraplex G-53. Paraplex G-62 (Rohm & Haas). Santicizer 140. Santicizer 160 (Monsanto). Admex 710 (Archer-Daniels-Midland). |

(3) A stabilizer to impart light and heat stability to the plastisol which captures chlorine given off during the curing of the plastic material to prevent discoloration or deterioration of the finished item. Among the many suitable stabilizers are the following:

| Trade Name | Chemical Nature | Manufacturer |
|---|---|---|
| Varca #10 | Barium-Cadmium Salt | Deecy Products Co. |
| Dyphos | Dibasic Lead Phosphite | National Lead Co. |
| Witco No. 90 | Fatty-acid Soaps | Witco Chemical Co. |

(4) Pigment to impart the desired color to the finished article.

It will be understood that the finished plastisol can be formulated from a wide variety of materials. One suitable formula is as follows:

50% Polyvinyl chloride resin—Geon 121 (B. F. Goodrich)
21% Admex #710 (Archer-Daniel-Midland)
29% Santicizer #160 (Monsanto)
0.05% Varco #10 (Deecy Products Company)
0.01% Colorants
0.005% Perfume wax (Sindar Corporation)

The foregoing ingredients are commercially available and are mixed together in drum 11 in the absence of any moisture or water vapor by use of a sigma blade mixer 11a. By means of conduit 12 and pump 13 the plastisol is pumped to the top of absorption tower 14. Tower 14 is filled with ceramic rings down through which the plastisol trickles and settles in the bottom of the tower. $CO_2$ gas under relatively low pressure is introduced into tower 14 from tank 16 through pipe 17 and is absorbed in the plastisol.

One of the characteristics of the present invention is the fact that the absorption takes place in tower 14 at low pressure, which results in a better quality final product. A $CO_2$ pressure of 35 to 40 p.s.i. is desirable at a room temperature of 60–70° F. If room temperature rises to the range of 80 to 100° F., the tower pressure is increased accordingly to about 50–60 p.s.i. The gassed plastisol is drawn out through the bottom of tower 14 through conduit 18 and is raised to a pressure of approximately 100 p.s.i. by pump 19. The diameter of pipe 18 relative to pipe 28 is in the ratio 2:1. A by-pass valve 21 is installed in line 22 connected by cross 23 with conduit 18 to recirculate the plastisol when it is not being injected into molds. Further, a surge pipe 24 is connected into cross 23 to compensate for pressure fluctuations during the cycle of filling molds 26. Valve 21 is a pressure relief valve so set that when the pressure in line 22 exceeds 100 p.s.i., valve 21 opens to maintain such pressure.

In order to inject the gassed plastisol into mold 26, a Bink air-actuated gun 27 is employed and is connected to cross 23 by pipe 28 and the pressure is read by gauge 31. One feature of the invention is the fact that pipe 18 is of considerably greater diameter than pipe 28. Pressure at gun 27 is preferably about 100 p.s.i. A source of compressed air in tank 32 is used to actuate gun 27 and for such purpose air pipe 33 leads from tank 32 to a three-way valve 34 controlled by a solenoid 36. In the modification of the invention illustrated in Fig. 2, solenoid 36 is actuated by an electric circuit using a pneumatic time delay relay 37 which may be adjusted so that valve 34 remains open the desired time interval to insure proper filling of the molds. One port 38 of valve 34 connects to pipe 33, another to pipe 39 which leads to gun 27 and the third port 41 exhausts to atmosphere. Accordingly, the operator closes switch 42 in the electric circuit energizing relay 37 when it is desired to fill mold 26. By reason of adjustment of timing relay 37, solenoid 36 holds valve 34 to establish communication between tank 32 and gun 27 so that compressed air enters gun 27 and fills the material from conduit 28 into mold 26. After the proper time interval, relay 37 opens and valve 34 exhausts and injection is terminated. Molds 26 are then conveyed to an oven 43 where they are cured for a time between 40 to 60 minutes at a temperature of 375–425° F. The mold is then cooled and the finished part removed.

An alternative construction is shown in Fig. 1 employing several parts similar to those shown in Fig. 2 and corresponding reference numerals are employed for substantially similar parts. A normally open, air-controlled valve 51 is installed in line 52 leading from cross 23, and beyond valve 51 is a second cross 53, one branch of which is connected to pipe 54 leading to gun 27. Another branch of cross 23 is connected by pipe 56 to material cylinders 57 in which reciprocates piston 58, piston rod 59 being articulately connected by joint 61 to rod 62 of piston 63 of air cylinder 64. An adjustable stop 66 is threaded on rod 59 to limit the movement of piston 58 to regulate the volume of material injected in mold 26 on each stroke. A fourth pipe 67 leads from cross 53 to normally closed pressure switch 68.

Three-way valve 34 controlled by solenoid 36 governs Binks gun 27, valve 51, which is connected into air line 39 by branch 69, and air cylinder 64 by branch 71 so that when solenoid 36 is energized, valve 51 is closed, air opens gun 27 and piston 58 in material cylinder 57 is advanced to force a metered charge of material to gun 27.

The electrical circuit for solenoid 36 includes a normally open treadle switch 76 in series with normally closed pressure switch 68. Normally open, single pole, single throw relay 77 is connected into the circuit, as graphically illustrated in Fig. 1, so that solenoid 36 remains energized after treadle switch 76 is closed until the pressure at switch 68 drops at the end of the stroke of piston 58, whereupon relay 77 is opened and valve 34 exhausts. Thereafter pump 19 builds up pressure in the system, thereby pushing back pistons 58 and 63 to fully retract position.

A first indicator light 81 is controlled by normally open micro-switch 82 to light when piston 58 is fully retracted to indicate to the operator that the system is ready to begin filling a mold. Switch 82 may be contacted by finger 83 on rod 62. Second indicator light 87 is connected in parallel with solenoid 36 and when extinguished indicates to the operator that filling of a mold is completed.

Although the foregoing invention has been described in some detail by way of illustration and example for purposes of clarity of understanding, it is understood that certain changes and modifications may be practiced within the spirit of the invention and scope of the appended claims.

What is claimed is:

1. A method of injection molding for sponge plastic articles comprising preparing a plastisol, absorbing inert gas into said plastisol at a relatively low pressure, increasing the pressure of gassed plastisol to a relatively high pressure after absorption and prior to injection into a mold, and injecting a measured quantity of the high pressure gassed plastisol into a mold.

2. A method of injection molding for sponge plastic comprising preparing a plastisol, subjecting said plastisol to inert gas at a pressure of about 35 p.s.i. at 60° F. room temperature to about 60 p.s.i. at 100° F. to produce gassed plastisol, increasing the pressure of gassed plastisol to about 100 p.s.i. after absorption and prior to injection into a mold and injecting a measured charge of the gassed plastisol into a mold.

3. A method according to claim 2 followed by curing the molded gassed plastisol at about 375–425° F. between 40 to 60 minutes.

4. A method of injection molding for sponge plastic articles comprising preparing a plastisol, absorbing inert gas into said plastisol at a relatively low pressure, increasing the pressure of gassed plastisol after absorption to a relatively high pressure, and passing the high pressure gassed plastisol through a valve to pass a measured quantity of the gassed plastisol into a mold.

5. A method of injection molding for sponge plastic articles comprising preparing a plastisol, absorbing inert gas into said plastisol at a relatively low pressure, increasing the pressure of gassed plastisol to a relatively high pressure, drawing in a measured quantity of high pressure gassed plastisol into a cylinder, cutting off the inward flow of plastisol into a cylinder, and forcing a measured quantity of high pressure plastisol from the cylinder into a mold.

References Cited in the file of this patent

UNITED STATES PATENTS

| | | |
|---|---|---|
| 2,156,508 | Minor | May 2, 1939 |
| 2,576,318 | Toulmin | Nov. 27, 1951 |
| 2,669,751 | McCurdy et al. | Feb. 23, 1954 |
| 2,763,475 | Dennis | Sept. 18, 1956 |
| 2,829,117 | Lindemann | Apr. 1, 1958 |

FOREIGN PATENTS

| | | |
|---|---|---|
| 458,729 | Canada | Aug. 9, 1949 |
| 521,827 | Belgium | Aug. 14, 1953 |
| 1,078,949 | France | May 19, 1954 |